US008031261B2

(12) United States Patent
Izawa et al.

(10) Patent No.: US 8,031,261 B2
(45) Date of Patent: Oct. 4, 2011

(54) IMAGE PICKUP APPARATUS WITH BACKLIGHT CORRECTION AND A METHOD THEREFOR

(75) Inventors: Katsutoshi Izawa, Asaka (JP); Masahiko Sugimoto, Asaka (JP)

(73) Assignee: Fujifilm Coporation, Tokyo (JP)

( * ) Notice: Subject to any disclaimer, the term of this patent is extended or adjusted under 35 U.S.C. 154(b) by 915 days.

(21) Appl. No.: 11/410,930

(22) Filed: Apr. 26, 2006

(65) Prior Publication Data
US 2006/0245007 A1    Nov. 2, 2006

(30) Foreign Application Priority Data

Apr. 28, 2005 (JP) ................................. 2005-132637

(51) Int. Cl.
G03B 7/00 (2006.01)
G03B 9/70 (2006.01)
G03B 15/03 (2006.01)
H04N 5/235 (2006.01)
H04N 5/222 (2006.01)
G06K 9/40 (2006.01)

(52) U.S. Cl. ..................... 348/362; 348/222.1; 348/370; 382/274; 396/166; 396/176

(58) Field of Classification Search ............... 348/222.1, 348/229.1, 230.1, 362–366, 370–371; 382/118, 382/168–172, 254, 274; 396/115, 165–167, 396/176–178
See application file for complete search history.

(56) References Cited

U.S. PATENT DOCUMENTS

| 4,690,536 A * | 9/1987 | Nakai et al. ................... 396/130 |
| 5,128,707 A * | 7/1992 | Muramatsu ................... 396/123 |
| 5,488,429 A | 1/1996 | Kojima et al. |
| 5,561,474 A | 10/1996 | Kojima et al. |
| 5,638,136 A * | 6/1997 | Kojima et al. ............... 348/653 |
| 6,215,961 B1* | 4/2001 | Mukai et al. ................ 396/100 |
| 7,092,625 B2* | 8/2006 | Nonaka .......................... 396/61 |
| 7,298,412 B2* | 11/2007 | Sannoh et al. ............... 348/348 |
| 7,345,702 B2* | 3/2008 | Kawahara ..................... 348/234 |
| 2006/0204056 A1* | 9/2006 | Steinberg et al. ............. 382/118 |

FOREIGN PATENT DOCUMENTS

| JP | 11-196292 | 7/1999 |
| JP | 2003-092700 A | 3/2003 |
| JP | 2004-153315 | 5/2004 |
| JP | 2004-363898 | 12/2004 |

* cited by examiner

Primary Examiner — David Ometz
Assistant Examiner — Richard Bemben
(74) Attorney, Agent, or Firm — Birch, Stewart, Kolasch & Birch, LLP

(57) ABSTRACT

An image pickup apparatus detects a face region out of an image signal representative of a field picked up by an image pickup device, and compares the lightness of the face region or a person region with the lightness of a background region also included in the image signal to thereby determine whether or not a subject is backlit. The apparatus causes, if the subject is backlit, the image pickup apparatus to execute actual pickup with backlight correction.

9 Claims, 7 Drawing Sheets

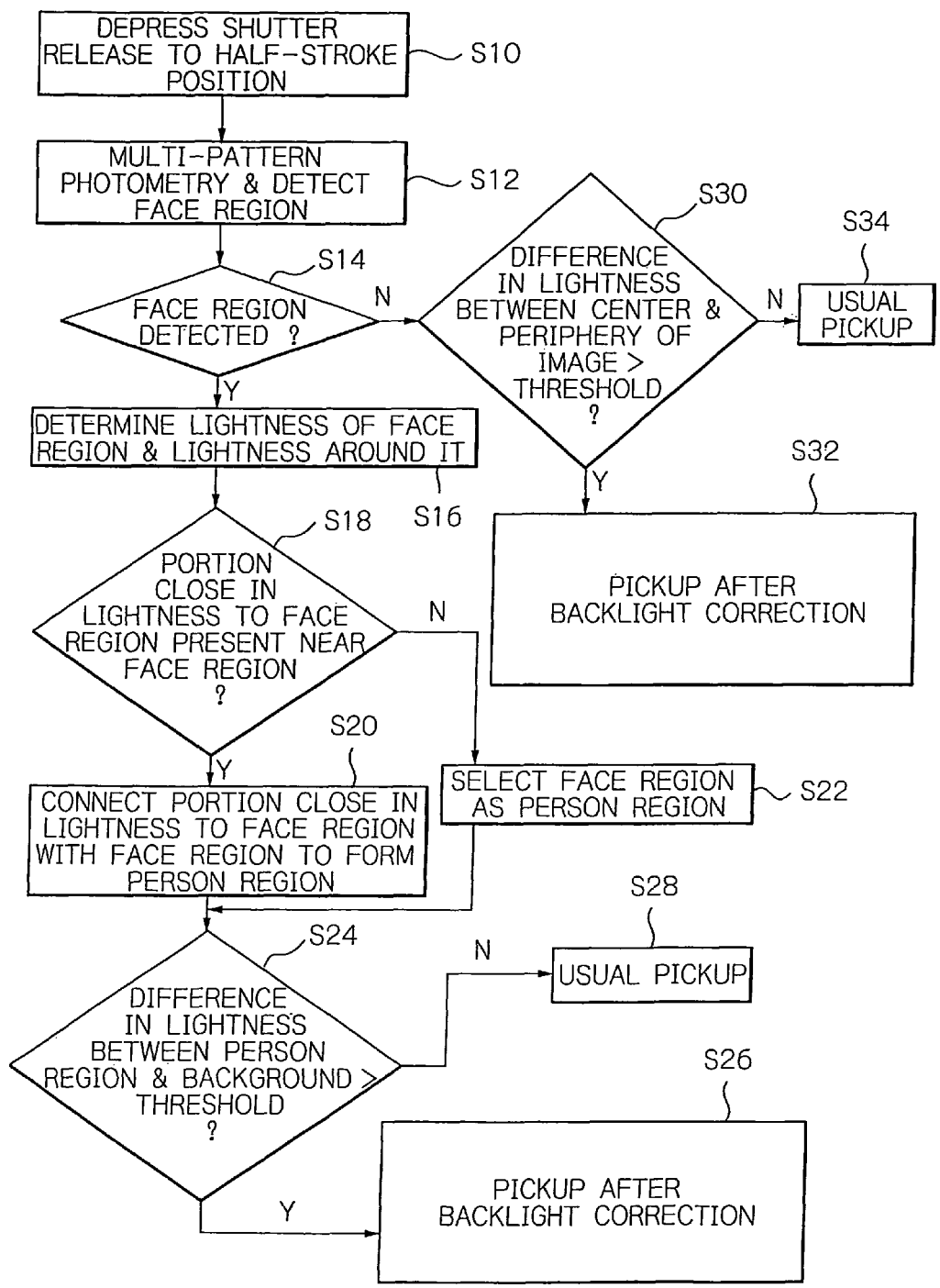

US 8,031,261 B2

IMAGE PICKUP APPARATUS WITH BACKLIGHT CORRECTION AND A METHOD THEREFOR

BACKGROUND OF THE INVENTION

1. Field of the Invention

The present invention relates to an image pickup apparatus including image pickup means for converting an optical signal generated via optics to an electric image signal, and more particularly to a still camera, video camera, cellular phone or similar image pickup apparatus. The invention also relates to a method of picking up an image.

2. Description of the Background Art

Japanese patent laid-open publication No. 2003-92700 and U.S. Pat. Nos. 5,488,429, 5,638,136 and 5,561,474 to Kojima et al, for example, disclose digital cameras of the type automatically releasing the shutter at adequate timing on detecting a face image and moreover automatically determining a frame size and executing backlight processing in accordance with the face image.

A digital camera may be adapted for recognizing a face image and measuring the lightness thereof to detect a backlight condition and automatically turn on a strobe when having determined the backlight condition. However, a problem with a digital camera having such a capability is that the camera is likely to erroneously detect a backlight condition which is contrary to fact.

Laid-open publication No. 2003-92700 and three Kojima et al mentioned above both do not take comparison between the lightness of a background and that of a subject into consideration because the former senses a face but does not sense background, while the latters simply use a flesh-color area for a decision, resulting in inaccurate correction of backlight. Further, neither one of the above four documents gives consideration to correction also necessary in the event of pickup of a subject against a night scene, i.e. pickup of a night scene.

SUMMARY OF THE INVENTION

It is an object of the present invention to provide an image forming apparatus and an image pickup method capable of enhancing accuracy in detection of a backlight condition or executing correction in the event of pickup of a night scene.

An image pickup apparatus including an image sensor for outputting an image signal representative of a field picked up of the present invention includes a detecting circuit for detecting a major subject region included in the field out of the image signal. A correction commanding circuit compares the lightness of the major subject region with the lightness of a pickup range including the major subject region or a pickup range not including the major subject region, and commands, if a difference between the lightness is above a predetermined level, the image sensor to execute correction. The image sensor is caused to pick up the field after the correction.

Further, an image pickup apparatus including an image sensor for outputting an image signal representative of a field picked up of the present invention includes a detecting circuit for detecting out of the image signal both of a major subject region included in the field and a region adjoining the major subject region and close in lightness thereto as a total region. A correction commanding circuit determines whether or not the total region is backlit on the basis of the lightness of the total region and commands, if the total region is backlit, the image sensor to execute correction. The image sensor is caused to pick up the field after the correction.

The correction is executed at least when the lightness of the major subject region or the total region is lower than the lightness of the range including the major subject region or the total region or the range not including the major subject region or the total region (the first correction), or when the lightness of the major subject region or the total region is higher than the lightness of the range including the major subject region or the total region or the range not including the subject region or the total region (the second correction). The first correction is executed when the major subject region or the total region is backlit. The second correction is executed on the pickup of a night scene. Further, an image pickup method is also disclosed in relation to the image pickup apparatus.

BRIEF DESCRIPTION OF THE DRAWINGS

The objects and features of the present invention will become more apparent from consideration of the following detailed description taken in conjunction with the accompanying drawings in which:

FIG. 3 is a flowchart demonstrating a specific backlight correction procedure executed by the illustrative embodiment;

DESCRIPTION OF THE PREFERRED EMBODIMENTS

Figure 1:
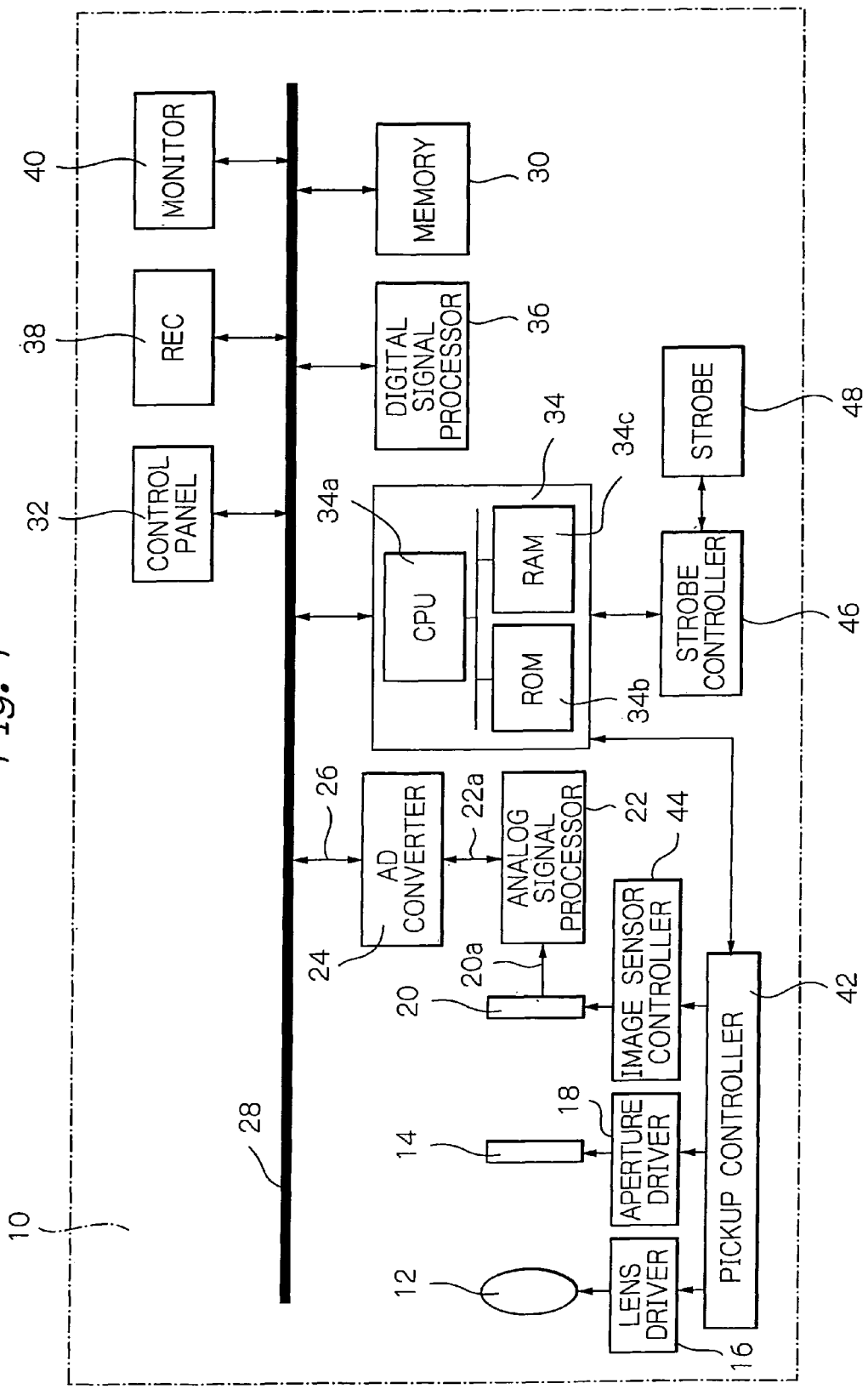
FIG. 1 is a schematic block diagram showing a preferred embodiment of the image pickup apparatus in accordance with the present invention.

FIG. 1 of the accompanying drawings shows an image pickup apparatus embodying the present invention. Briefly, when the operator of the image pickup apparatus of the illustrative embodiment depresses a shutter release button to its half-stroke position, the apparatus detects a major subject region included in the field while executing the multiple-block type of photometry. It is to be noted that the major subject region refers to the face region of a subject, when it is a person, and is distinguished from a total region referring to both of the face region and body of the subject. More specifically, the image pickup apparatus detects a region adjoining the major subject region and close in lightness to the same as a body region, groups the body region and face region into a single person region, which is the total region, compares the lightness of the person region with that of a background region, and then turns on, if the result of decision shows that the person is backlit, light-emitting or flashing means, such as a strobe, a light emitting diode (LED).

If desired, the apparatus may be adapted to determine whether or not the lightness of the total region itself is lower than preselected lightness to determine whether or not a person in the total region is backlit.

In any case, the illustrative embodiment is capable of taking not only the face region but also the entire person region into consideration to thereby determine whether or not a person or subject is backlit. Further, the illustrative embodiment compares the lightness of the person region or total region with the lightness of the background to thereby enhance accuracy in decision on backlight. Higher accuracy of decision on backlight is achievable even when the lightness of the face region is compared with the lightness of the background than when only the lightness of the face region is taken into consideration.

To correct backlight, the illustrative embodiment may be adapted for executing exposure control instead of, or in addition to, light emission mentioned earlier, as the case may be. For example, exposure may be controlled in accordance with the photometric value of the person region or in accordance with a difference between the lightness of the person region and the lightness of the background.

As shown in FIG. 1, the image forming apparatus, generally 10, is implemented as an electronic still camera by way of example and includes a lens 12. Light incident on the lens 12 is converged thereby and then restricted in size by an aperture diaphragm 14. The lens 12 and aperture diaphragm 14 are mechanically driven by a lens driver 16 and an aperture driver 18, respectively.

The light having passed through the aperture diaphragm 14 is focused on a CCD (Charge Coupled Device) type of image sensor 20 and converted to an electric signal 20a thereby. The electric signal 20a thus produced is input to an analog signal processor 22. The analog signal processor 22 executes correlated-double sampling (CDS) or similar signal processing for canceling noise contained in the signal 20a. The resulting noise-free signal 22a is fed from the analog signal processor 22 to an analog-to-digital (AD) converter 24. The AD converter 24 converts the input signal 22a, which is analog, to a corresponding digital signal, and delivers the digital signal to a bus 28 in the form of image signal 26. The image signal 26 is written to a memory 30 over the bus 28.

The image signal 26 thus stored in the memory 30 is processed in a particular manner in each of preliminary pickup and actual pickup. Preliminary pickup occurs when the operator of the camera 10 depresses a shutter release button, not shown, positioned on a control panel 32 to its half-stroke position, executing photometry and ranging for actual pickup. Actual pickup occurs when the operator, holding the shutter release button at its half-stroke position, further depresses it to its full-stroke position.

The apparatus 10 includes a system controller 34 implemented by a conventional microcomputer including a CPU (Central Processor Unit) 34a, a ROM (Read Only Memory) 34b and a RAM (Random Access Memory) or work memory 34c. The system controller 34 reads out the image signal 26 generated by preliminary pickup from the memory 30 and then executes conventional photometry. Further, in the illustrative embodiment, the system controller 34 detects a face region and a body region on the basis of the image signal 26, compares the lightness of a person region made up of the face region and body region with the lightness of the background, and turns on a strobe 48 if the result of the above comparison shows that the person or subject is backlit. Such a procedure will be described more specifically later.

The system controller 34 executes the above processing and control over the entire camera 10 in accordance with control program sequences which are stored in the ROM 34b together with control parameters. Further, the system controller 34 controls the lens driver 16 and aperture driver 18 as well as an image sensor controller 44 via a pickup controller 42. The image sensor controller 44 is configured to send various signals, including timing signals, to the image sensor 20. In addition, the system controller 34 controls a strobe controller 46 configured to apply a voltage to the strobe 48.

The apparatus 10 also includes a digital signal processor 36, which reads out an image signal 26 generated by actual pickup and executes automatic white balance control and other processing on the image signal 26. The image thus processed is recorded in a recorder 38 and displayed on a display monitor 40.

In the illustrative embodiment, the lens 12, lens driver 16, aperture diaphragm 14, aperture driver 18, image sensor 20 and image sensor controller 44 constitute an image pickup device in combination while the system controller 34 plays the role of a detecting circuit and a correction commanding circuit.

The general operation of the entire still camera 10 will be described with reference to FIG. 1. The operator of the camera 10, looking at a desired subject via a viewfinder, not shown, or the monitor 40, depresses the shutter release button of the control panel 32 to its half-stroke position. In response, a signal representative of the half-stroke position of the shutter release button is fed from the control panel 32 to the system controller. On receiving the above signal, the system controller 34 causes the image sensor 20 to transform light incident from the subject to a signal 20a. The signal 20a is sequentially read out in response to a clock signal output from the image sensor controller 44, and then subject to noise cancellation and other conventional processing in the analog signal processor 22. A signal 22a output from the analog signal processor 22 is converted to a digital image signal 26 by the AD converter 24, and then written to the memory 30 over the bus 28.

Subsequently, the system controller 34 reads out the image signal 26 stored in the memory 30 and executes photometry on the basis of the image signal 26. At the same time, the system controller 34 determines whether or not backlight correction is necessary on the basis of the image signal 26. The system controller 34 then determines an exposure value and whether or not to turn on the strobe 48, and drives the lens 12 and aperture diaphragm 14 via the image pickup controller 42 accordingly, thus preparing for actual pickup to follow.

When the operator further depresses the shutter release button from its half-stroke position to its full-stroke position, a signal is fed from the control panel 32. In response, the system controller 34 causes the image sensor 20 to convert light incident from the subject to an image signal 20a. At this instant, the strobe 48 emits light, if necessary. The signal 20a is converted to a corresponding digital image signal 26, and then written to the memory 30 over the bus 28 in the same manner as the signal 20a output during preliminary pickup.

The image signal 26 is input to the digital signal processor 36 to be subject to white balance control and other processing, and then transferred to and recorded by the recorder 38. Further, the image signal 26 may be visualized or displayed on the monitor 40 in response to a command input on the control panel 32 by the operator.

It will be described more specifically hereinafter how the system controller 34 detects a person region and how it corrects backlight. Briefly, the system controller 34 first detects a face image out of the image signal and then decides a region including the face image as a face region. To the illustrative embodiment, applicable is a method taught in either one of laid-open publication No. 2003-92700 and three Kojima et al mentioned previously to detect a face image in such a specific manner to be described below.

The image signal 26 representative of a subject picked up by the image sensor 20 at the preliminary pickup stage is written to the memory 30. Subsequently, the system controller 34 reads out the image signal 26 from the memory 30 on a predetermined-unit basis at a time, e.g. a frame or several bytes at a time, and then compares it with various kinds of data representative of the features of a face stored in the internal storage such as the ROM 34b or memory 30 by using any one of conventional algorithms. The data stored in the internal storage may include template data relating to the contour of a face, eyes, nose, mouth, ears and so forth of persons. The system controller 34 determines as a face image a portion of the image signal 26 coincident with the template data to more than a predetermined degree.

In an application where the person region is not the subject region to be picked up, the apparatus 10 may be adapted to include template data matching with the major subject region, e.g. a building region or a vehicle region.

In the illustrative embodiment, the entire pickup range or image signal is divided into a plurality of blocks beforehand, so that the system controller 34 determines which one or more of the blocks contain the face image portion of the image signal 26 to be the face region. FIG. 2A shows a specific pickup range divided into nine blocks 50a through 50i for the description purpose only. In FIG. 2A, the portion of the image signal 26 determined to be a face image 50j is shown as lying in the block 50e.

The system controller 34, thus having detected the face region or block 50e, measures the lightness of the blocks around the face block 50e on the basis of the image signal 26. If a portion 50k of the image signal 26 comparable in lightness with the face image 50j lies in the block 50h adjoining the face block 50e, then the system controller 34 determines the portion 50k to be a body or torso image and determines the block 50h as a body or torso region or block. Thereafter, as shown in FIG. 2B, the system controller 34 combines the face block 50e and body block 50h to produce a person region 52a while combining the other blocks to produce a background region 52b.

While the illustrative embodiment deals with the person region 53a and background region 52b as discrete regions not overlapping each other, the background region, distinguished from the person region on the basis of lightness, may be selected by any other suitable scheme. For example, as a background region, selection may be made on a pickup range including a major subject region or a pickup range including no major subject region.

More specifically, the background region may be implemented by the entire pickup frame including a person region or by only part of such a frame. When the background region is implemented by part of the pickup frame, the background region may include part of or the entire person region. Of course, the background region may not include a person region at all, in which case the entire region not identified as a person region or part of such a region may be used as a background region.

Figure 2B:
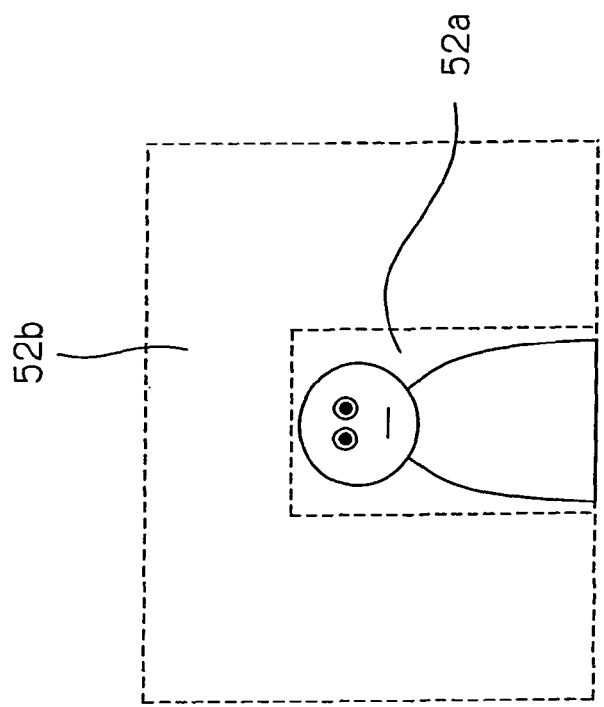
FIGS. 2A and 2B show a specific face region, a specific person region and so forth detected in the illustrative embodiment.
Figure 2A:
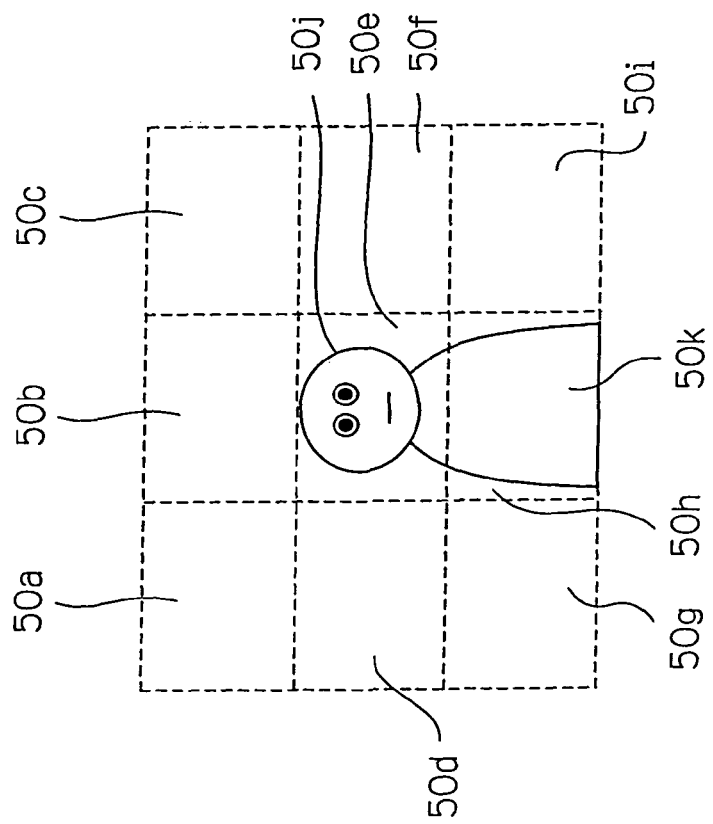

FIGS. 2A and 2B show a specific case wherein the pickup range or frame includes a single person and a single person region 52a. When the pickup range includes a plurality of major subject regions, a particular person region may be selected out of the major subject regions, and has its lightness regarded as the lightness of a major subject region to compared with the lightness of the background. The particular person region mentioned above may be implemented as a person region positioned at or around the center of the field and/or a person region greatest in the size or the lightness of the major subject region. When a plurality of major subject regions exist, the mean lightness of the major subject regions may be calculated to be compared with the lightness of the background as the lightness of a major subject region.

In FIG. 2A, the face region 50e and body region 50h contain the face image 50j and body image 50k, respectively, and are greater than the face image 50j and body image 50k, respectively. Alternatively, an arrangement may be made such that the face region and body region contain part of a face image and part of a body image, respectively, and are smaller than the face image and body image, respectively.

Subsequently, the system controller 34 compares the lightness of the person region 52a with the lightness of the background region 52b for thereby determining whether or not the person is backlit. More specifically, the system controller 34 calculates the mean value lu_b_ave, maximum value lu_b_max and minimum value lu_b_min of the lightness of the background region 52b, and calculates the mean value Lu_p_ave and maximum value lu_p_max of the lightness of the person region 52a. It is to be noted that the minimum value of the lightness of the person region 52a is not necessary when it comes to backlight correction.

The following six different relations are available for determining whether or not the person is backlit:

lu_b_ave−lu_p_ave>th_1
lu_b_max−lu_p_max>th_2
lu_b_min−lu_p_ave>th_3
lu_b_ave−lu_p_max>th_4
lu_b_max−lu_p_ave>th_5
lu_b_min−lu_p_max>th_6 where th_1 through th_6 each are a particular threshold value representative of backlight. Any of the six relations may be used alone or in combination, as desired. If the image signal 26 output at the preliminary pickup stage satisfies one or more of the relations thus selected, the system controller 34 determines that the person is backlit.

When the system controller 34 determines that the person is backlit, it corrects the backlight condition by one or more of the following schemes (1), (2) and (3):

(1) turning on the strobe 48, FIG. 1, or similar light-emitting means;

(2) controlling exposure in matching relation to the photometric value of the person region, more specifically making the aperture greater or making shutter speed lower as the person region becomes darker; and (3) controlling exposure in accordance with the difference in lightness between the person region and the background region, more specifically, when the person region becomes darker than the background, making the aperture greater or making shutter speed lower as the difference between the person region and the background region becomes greater.

Reference will be made to FIG. 3 for describing a specific backlight correction procedure unique to the illustrative embodiment. As shown, when the operator of the camera 10 depresses the shutter release button to its half-stroke position (step S10), the system controller 34 executes multiple-block photometry, and then searches for a face region in the resulting image signal 26 (step S12), as stated previously. If a face region is detected (Y, step S14), the system controller 34 examines the lightness of the face region and lightness around it in order to detect a person region (step S16). The system controller 34 then determines whether or not a portion close in lightness to the face region exists in the vicinity of the face region (step S18).

If the answer of the step S18 is positive, Y, then the system controller connects the portion close in lightness to the face region to the face region for thereby forming a person region (step S20). If the answer of the step S18 is negative, N, then the system controller 34 determines the face region to be a person region (step S22). Subsequently, to see whether or not the person is backlit, the system controller 36 determines whether or not a difference in lightness between the person region and the background region is greater than the threshold value or values by using one or more of the six relations stated earlier (step S24).

If the answer of the step S24 is positive, Y, the system controller 34 executes backlight correction before actual pickup by determining that the person is backlit (step S26). For the backlight correction, the system controller 34 uses one or more of the schemes (1) through (3) stated previously, i.e. turns on the strobe, controls exposure in matching relation to the photometric value of the person region and/or controls exposure on the basis of a difference between the person region and the background region. On the other hand, if the answer of the step S24 is negative, N, the system controller 34 executes usual pickup by determining that the person is not backlit (step S28).

Assume that a face region is not detected in the image signal 26 (N, step S14). Then, the system controller 34 determines that whether or not a difference in lightness between the center portion and the peripheral portion of the frame is greater than a preselected threshold value (step S30). More specifically, even when a face region is not detected, it is generally considered that a subject with which the operator has concern is positioned at the center portion of the frame, and such a subject may be backlit. For these reasons, the illustrative embodiment executes backlight correction if the subject is backlit. For this decision, the six different relations stated earlier are also applicable if the face region and background region are simply translated into the center portion and peripheral portion of the frame, respectively.

If the difference in lightness between the center portion and the peripheral portion of the frame is greater than the threshold value (Y, step S30), the system controller 34 determines that the subject is backlit and then executes backlight correction before actual pickup (step S32). For backlight correction, the system controller 34 turns on the strobe 48, FIG. 1, or controls exposure in accordance with the result of multiple-block photometry or the result of spot photometry. If the answer of the step S30 is N, the system controller 34 executes usual pickup by determining that the subject is not backlit (step S34).

Exposure control based on the result of multiple-block photometry refers to effecting photometry with a plurality of blocks constituting a single image and then either increasing the aperture or decreasing shutter speed in accordance with the increase in the difference lightness between the center portion and the peripheral portion of the frame determined by the photometry. On the other hand, exposure control based on the result of spot photometry refers to increasing the aperture or decreasing shutter speed in accordance with the decrease in the lightness of the center portion of an image determined by the block-by-block photometry.

As stated above, the illustrative embodiment is capable of detecting a backlight condition with higher accuracy.

An alternative embodiment of the present invention will be described hereinafter and is practicable when a plurality of major subject regions exist in a field to be picked up. Briefly, the alternative embodiment calculates the mean lightness of the plurality of major subject regions as the lightness of a major subject region, and allows the operator to compare the lightness of the major subject region with the lightness of the background or select particular one of the plurality of major subject regions and compare the lightness of the particular major subject region selected with the lightness of the background, as desired.

Figure 4:
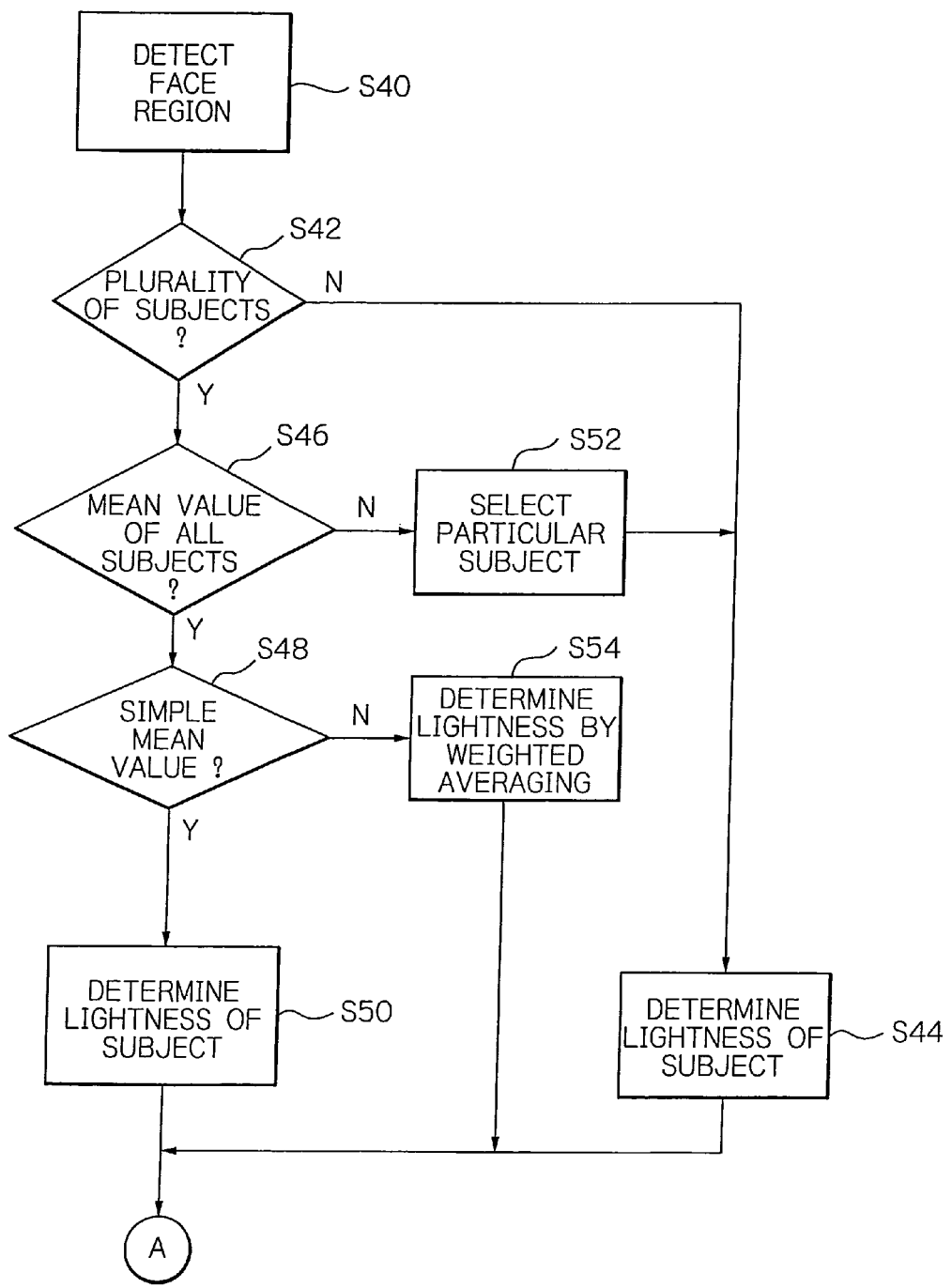
FIGS. 4 and 5 a flowchart demonstrating a backlight correction procedure representative of an alternative embodiment of the present invention.
Figure 5:
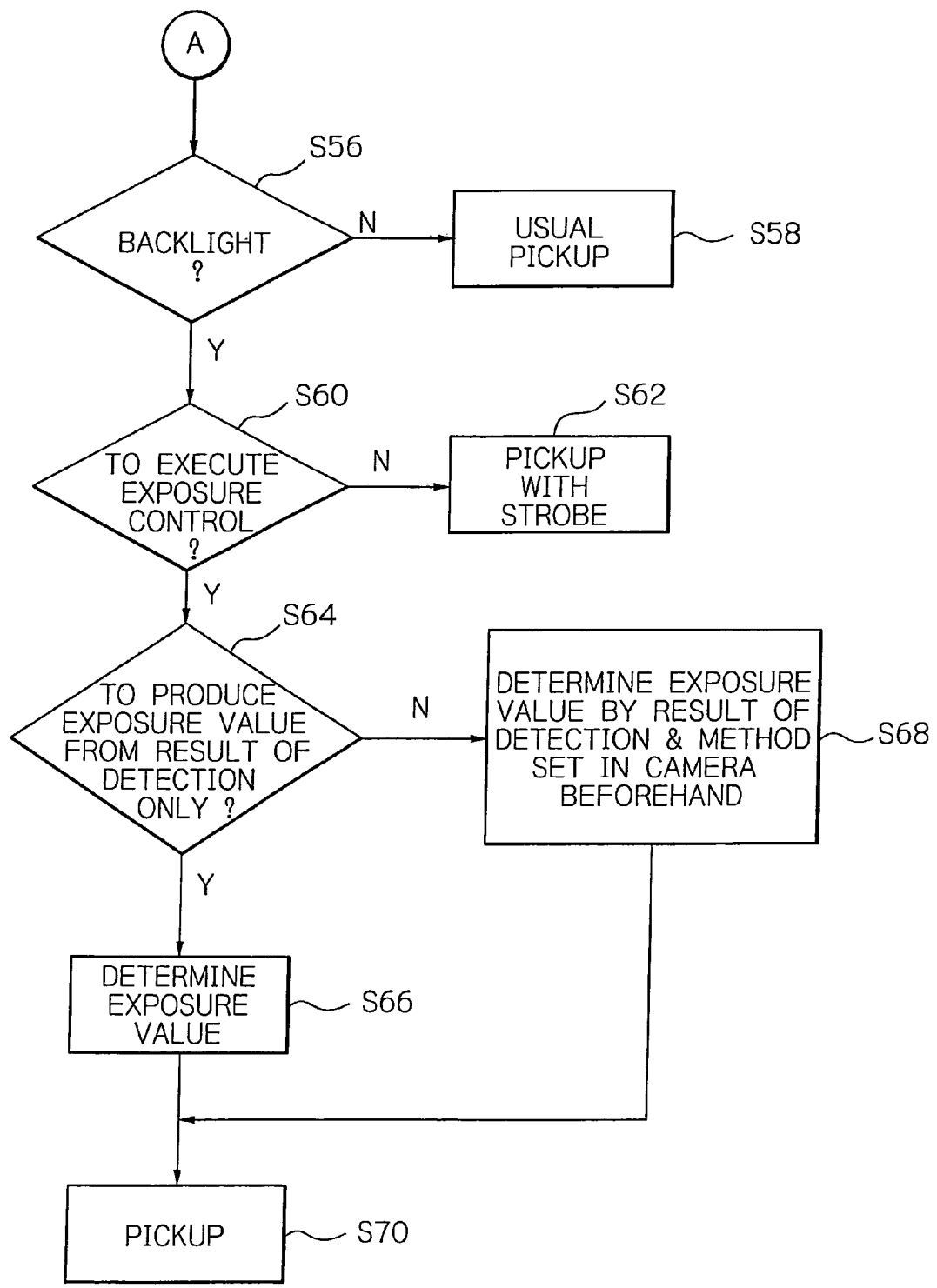
Figure 6:
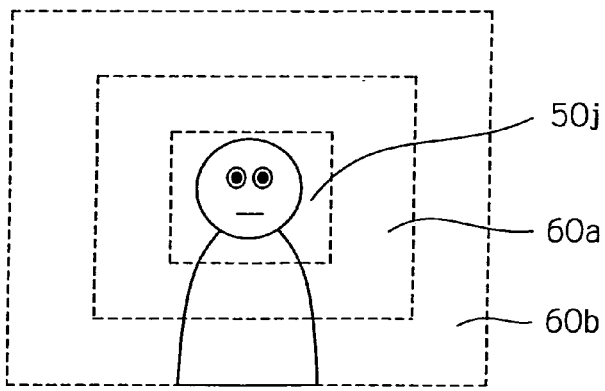
FIGS. 6, 7A, 7B and 7C are views useful for understanding a specific method of producing a weighted exposure value.
Figure 7A:
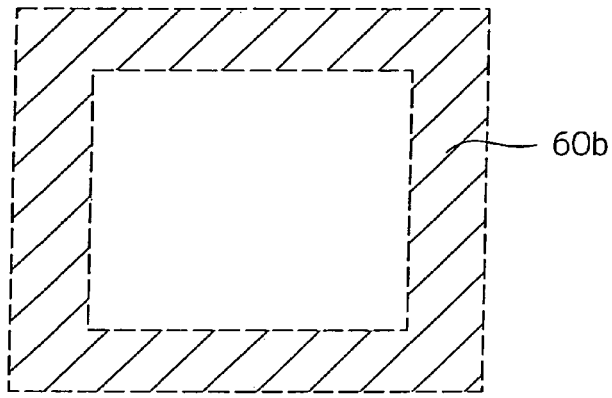
Figure 7B:
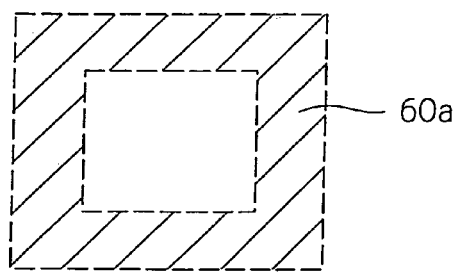
Figure 7C:

FIGS. 4 and 5 are flowcharts demonstrating a specific backlight correction procedure unique to the alternative embodiment. As shown, when the operator depresses the shutter release button, not shown, to its half-stroke position, the system controller 34 effects multiple-block photometry and then searches for a face region in the resulting image signal. In the procedure shown in FIGS. 4 and 5, a face region is assumed to be detected in the image signal (step S40). If a face region is not detected, the procedure described with reference to FIG. 3 is executed. While the alternative embodiment assumes a face region as a major subject region, the procedure of FIGS. 4 and 5 is similarly applicable to a case wherein total region is the major subject region. The steps described so far may be identical with the steps S10 and S12 shown in FIG. 3.

After the step S40, the system controller 34 determines whether or not a plurality of major subject regions exist in the frame (step S42). If the answer of the step S42 is negative, N, meaning that only one major subject region exists in the frame, then the system controller 34 determines the lightness of the major subject region (step S44).

If the answer of the step S42 is positive, Y, meaning that a plurality of major subject regions exist, the system controller 34 determines whether or not to calculate the mean lightness of all the major subject regions as the lightness of a major subject region (step S46). This decision is made when commanded by the user and can be made any time after the power-up of the camera. If such a decision is not selected by the user, the system controller 34 accords to a default condition which may be set by, e.g. a default controller on the power-up of the camera.

If the answer of the step S46 is positive, Y, then the system controller 34 determines whether or not to simply calculate the mean lightness of the major subject regions (step S48). This decision is also made when selected by the user. Alternatively, the user cannot command but the system controller 34 may accord to only default setting. If the answer of the step S48 is positive, Y, the system controller 34 simply produces the mean lightness of the major subject regions, i.e. adds the lightness of all the major subject regions and then divides the resulting sum by the number of the major subject regions (step S50).

On the other hand, if the answer of the step S46 is negative, N, the system controller 34 selects one of the plurality of major subject regions (step S52). This selection may be made on the basis of at least one of the position, area and lightness of a major subject region. For example, the system controller 34 selects a particular major subject region according to one of three criteria, i.e. the region has a maximum value, a median value, or a minimum value of the lightness among the plurality of major subject regions. Alternatively, it may select a particular major subject region according to one of three criteria, i.e. the region has a maximum value, a median value, or a minimum value of the area among them. Further, there may be selected at least one of a major subject region positioned at or around the center of the field, a major subject region having the broadest area and a major subject region having the highest lightness.

After a particular major subject region has thus been selected (step S52), the system controller 34 determines the lightness of the major subject region (step S44).

If the simple mean lightness of the major subject regions is not selected by the operator (N, step S48), the system controller 34 calculates the weighted mean lightness of the major subject regions on an area basis for thereby determining the lightness of a major subject region (step S54).

As shown in FIG. 5, the step S54 of FIG. 4 is followed by a step S56 for comparing the lightness of the major subject region and the lightness of the background included in the field in order to determine whether or not the person or subject is backlit (step S56). If the answer of the step S56 is negative, N, the system controller 34 executes usual pickup without backlight correction (step S58).

If the answer of the step S56 is positive, Y, then the system controller 34 first determines whether or not to execute exposure control as backlight correction (step S60). This decision is made if commanded by the user. Alternatively, the user cannot command but the system controller 34 may accord to only default setting. If the answer of the step S60 is negative, N, the system controller 34 executes pickup by turning on the strobe 48 (step S62).

If the answer of the step S60 is positive, Y, meaning that exposure control is selected by the operator as backlight correction, the system controller 34 determines whether only an exposure value produced from the lightness of the subject should be used or an exposure value should be determined by giving consideration to an exposure value calculated by a conventional method set in the camera beforehand also (step S64).

If the answer of the step S64 is positive, Y, then the control proceeds to the step S66. In the step S66, the system controller 34 uses a weighted exposure value produced by assigning the greatest weight to the major subject region and reducing it in accordance with the distance from the major subject region (first method hereinafter referred to) or a weighted exposure value produced from a weight assigned to the major subject region and a weight assigned to the other region (second method hereinafter).

Figure 8:
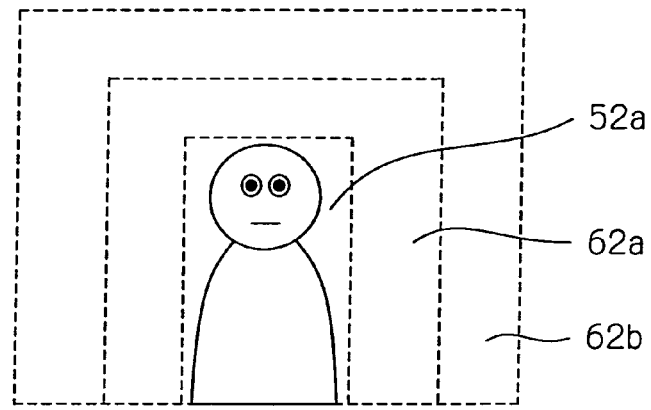
FIGS. 8, 9 and 10 are views useful for understanding other specific methods of producing a weighted exposure value.

The first method will be described more specifically with reference to FIGS. 6, 7A, 7B and 7C. As shown, assume that weights w1 and w2 are respectively assigned to the face region 50j and a region or zone 60a surrounding the face region 50j while a weight w3 is assigned to a region or zone 60b surrounding the region 60a, i.e. gradation is provided in three Consecutive steps by way of example. The weights w1, w2 and w3 sequentially decrease in this order and may be "10", "4" and "1", respectively, for example. Likewise, as shown in FIG. 8, when the total region is used, weights w4 and w5 are respectively assigned to the person region 52a and a region or zone 62a surrounding it while a weight w6 is assigned to a region or zone 62b surrounding the region 62a. The weights w4, w5 and w6 sequentially decrease in this order and may be "10", "4" and "1", respectively.

Figure 9:
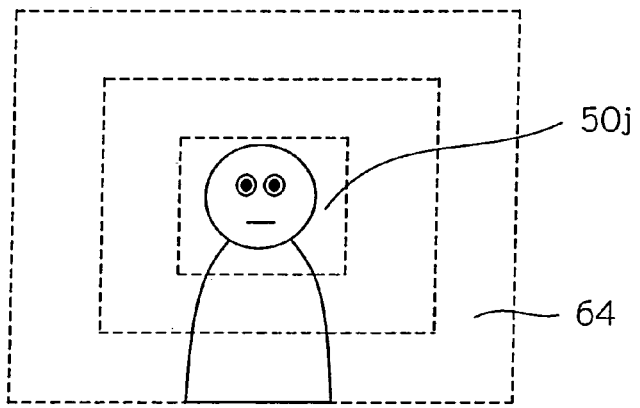
Figure 10:
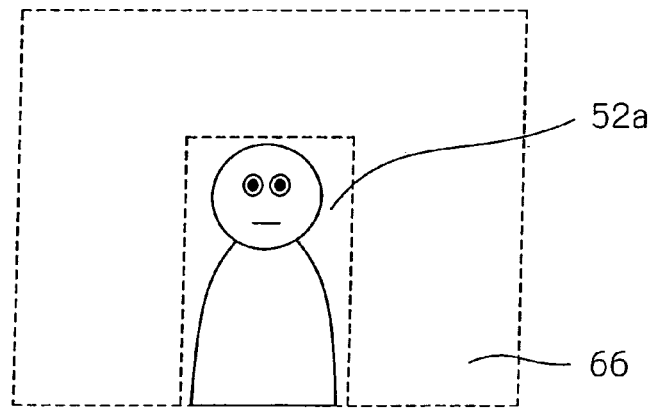

FIG. 9 will now be referred to describe the second method more specifically. In the example shown in the figure, weights w7 and w8 are assigned to the face region 50j and the other region 64 around the face region 50j, respectively, and may be "10" and "1", respectively. Stated in another way, the frame is divided into the fade region 50j and the other region. Likewise, in the example shown in FIG. 10, in which the total region is used, weights w9 and w10 are assigned to the person region 52a and the other region 66, respectively, and may be "10" and "1", respectively.

Referring again to FIG. 5, if an exposure value should be determined in consideration of an exposure value calculated by the method set in the camera beforehand also (N, step S64), the system controller 34 uses an exposure value (c) produced from a weighted exposure value (a) calculated in the same manner as in the step S66 and an exposure value (b) determined by a method set in the camera beforehand. More specifically, the exposure value (c) is produced by:

$$c=b+k(a-b)$$

where k denotes a weighting coefficient. The exposure value (a) is greater than the exposure value (b) while the weighting coefficient k is between "0" and "1". Also, k (a−b) is smaller than (a−b) while c (=b+k(a−b)) is between (a) and (b). It is to be noted that the value of (a−b) may be greater than a first threshold value inclusive, but smaller than a second threshold value inclusive.

After the step S66 or S68 stated above, the system controller 34 executes actual pickup (step S70). With the procedure described above, it is possible to accomplish a camera and an image pickup method capable of accurately detecting a backlight condition.

In a more generic sense, the exposure value (c) may alternatively be produced by:

$$c=k1 \times b+k2 \times b$$

where k1 and k2 are weighting coefficients. The value of (c−b) may be greater than a first threshold value inclusive, but smaller than a second threshold value inclusive.

In summary, it will be seen that the present invention provides an image pickup apparatus and an image pickup method capable of detecting a backlight condition with higher accuracy or implementing desirable pickup of a night scene.

The entire disclosure of Japanese patent application No. 2005-132637 filed on Apr. 28, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image pickup apparatus including an image pickup device for outputting an image signal representative of a field picked up, comprising:
    a detecting circuit for detecting a face region included in the field out of the image signal; and
    a backlight detecting circuit for comparing lightness of the face region with lightness of a first pickup range including the face region or a second pickup range not including the face region, and a correction commanding circuit commanding, if a difference between the lightness of the face region with lightness of a first pickup range including the face region or a second pickup range not including the face region is above a predetermined value, said image pickup device to execute correction;
    said image pickup device picking up the field after the correction,
    wherein said detecting circuit detects both of the face region and a region adjoining the face region and close in lightness to the face region as a person region,
    said backlight detecting circuit comparing lightness of the person region with lightness of a third pickup range including the person region or a fourth pickup range not including the person region, and said correction commanding circuit commanding, if a difference between the lightness of the person region with lightness of a third pickup range including the person region or a fourth pickup range not including the person region is above a predetermined value, said image pickup device to execute the correction,
    wherein when a plurality of person regions are present in the field, said correction commanding circuit calculates, as the lightness of the person region, mean lightness by averaging lightness of the plurality of person regions, and compares the lightness of the person region with the lightness of the third pickup range or the fourth pickup range.

2. The apparatus in accordance with claim 1, wherein said correction commanding circuit calculates, when calculating the mean lightness of the plurality of person regions, a weighted mean based on an area of the person region.

3. An image pickup apparatus including an image pickup device for outputting an image signal representative of a field picked up, comprising:
- a detecting circuit for detecting a face region included in the field out of the image signal; and
- a backlight detecting circuit for comparing lightness of the face region with lightness of a first pickup range including the face region or a second pickup range not including the face region, and a correction commanding circuit commanding, if a difference between the lightness of the face region with lightness of a first pickup range including the face region or a second pickup range not including the face region is above a predetermined value, said image pickup device to execute correction;
- said image pickup device picking up the field after the correction,
- wherein said detecting circuit detects both of the face region and a region adjoining the face region and close in lightness to the face region as a person region,
- said backlight detecting circuit comparing lightness of the person region with lightness of a third pickup range including the person region or a fourth pickup range not including the person region, and said correction commanding circuit commanding, if a difference between the lightness of the person region with lightness of a third pickup range including the person region or a fourth pickup range not including the person region is above a predetermined value, said image pickup device to execute the correction,
- wherein when a plurality of person regions are present in the field, said correction commanding circuit selects a particular person region out of the plurality of person regions, and compares lightness of the particular person region with lightness of the pickup range including the particular person region or the pickup range not including the particular person region.

4. The apparatus in accordance with claim 3, wherein said correction commanding circuit selects the particular person region on a basis of at least one of a position, an area and lightness of the person region.

5. The apparatus in accordance with claim 4, wherein said correction commanding circuit selects the particular person region on a basis of one of a maximum value, a median value and a minimum value of the lightness of the person region.

6. The apparatus in accordance with claim 4, wherein said correction commanding circuit selects the particular person region on a basis of one of a maximum value, a median value and a minimum value of the area of the person region.

7. The apparatus in accordance with claim 4, wherein the particular person region comprises at least one of a person region positioned at a center of the field, a person region having a greatest area and a person region having highest lightness.

8. The apparatus in accordance with claim 1, wherein the correction comprises at least one of emission of light from a light emitting device and exposure control,
the exposure control using a weighted exposure value produced by assigning a great weight to the person region detected and sequentially reducing a weight in accordance with a distance from the person region.

9. The apparatus in accordance with claim 1, wherein the correction comprises at least one of emission of light from a light emitting device and exposure control,
the exposure control using a weighted exposure value produced from a weight assigned to the person region detected and a weight assigned to a region other than the person region and different in the weight assigned to the person region.

* * * * *